United States Patent
Cayton et al.

(10) Patent No.: US 7,496,518 B1
(45) Date of Patent: Feb. 24, 2009

(54) SYSTEM AND METHOD FOR AUTOMATED SCREENING AND QUALIFICATION OF EMPLOYMENT CANDIDATES

(75) Inventors: Alan B. Cayton, Fairview, TX (US); J. Brandt Hamby, Plano, TX (US); J. Kevin Leonard, Plano, TX (US)

(73) Assignee: Strategic Outsourcing Corporation, Richardson, TX (US)

( * ) Notice: Subject to any disclaimer, the term of this patent is extended or adjusted under 35 U.S.C. 154(b) by 1103 days.

(21) Appl. No.: 09/641,021

(22) Filed: Aug. 17, 2000

(51) Int. Cl.
*G06Q 99/00* (2006.01)
(52) U.S. Cl. .......................................................... 705/1
(58) Field of Classification Search ....................... 705/1
See application file for complete search history.

(56) References Cited

U.S. PATENT DOCUMENTS

| | | | | |
|---|---|---|---|---|
| 5,164,897 | A | * | 11/1992 | Clark et al. ..................... 705/1 |
| 5,765,138 | A | * | 6/1998 | Aycock et al. .................. 705/7 |
| 5,832,497 | A | * | 11/1998 | Taylor ...................... 707/104.1 |
| 5,867,822 | A | * | 2/1999 | Sankar ........................... 705/8 |
| 5,978,768 | A | * | 11/1999 | McGovern et al. ............. 705/1 |
| 6,064,977 | A | * | 5/2000 | Haverstock et al. ............ 705/9 |
| 6,070,143 | A | * | 5/2000 | Barney et al. .................. 705/8 |
| 6,266,659 | B1 | * | 7/2001 | Nadkarni ....................... 707/3 |
| 6,272,467 | B1 | * | 8/2001 | Durand et al. ................. 705/1 |
| 6,289,340 | B1 | * | 9/2001 | Puram et al. ................... 707/5 |

(Continued)

FOREIGN PATENT DOCUMENTS

| | | | |
|---|---|---|---|
| JP | 2000057213 | A * | 2/2000 |
| JP | 2002024459 | A * | 1/2002 |
| WO | WO 200104811 | A1 * | 1/2001 |

OTHER PUBLICATIONS

Rubinstein, Ed, "Operators embrace automated systems to hire the best, reduce turnover," Nation's Restaurant News, v31n25, pp. 71,80, Jun. 23, 1997.*

(Continued)

*Primary Examiner*—Jonathan Ouellette
(74) *Attorney, Agent, or Firm*—Fulbright & Jaworski L.L.P.

(57) ABSTRACT

A system and method are disclosed which assist an employer in determining qualified candidates for positions of employment with the employer in an efficient and cost-effective manner. A preferred embodiment provides a software product that enables employers to generate a customized application program executable to interact with candidates and determine the qualified candidates for a position with the employer. More specifically, the software product receives as input from the employer a desired hiring criteria, and then generates a customized application program that utilizes the desired hiring criteria to determine the qualified candidates for the employer. Most preferably, a customized application program is generated, with which candidates may interact to effectively self-administer a qualification session for a position with the employer. In a most preferred embodiment, the generated application program may, upon determining a qualified candidate, take actions necessary to assist in further consideration of the qualified candidate. As an example, the application program may access a hiring manager's calendar, and schedule an interview for the qualified candidate at an available time. As a further example, the application program may forward information about the qualified candidate (e.g., resume, responses of the candidate to a questionnaire conducted by the application program, writing sample, letters of recommendation, etcetera) to the hiring manager via e-mail, fax, or some other method of communicating data.

92 Claims, 4 Drawing Sheets

U.S. PATENT DOCUMENTS

| | | | |
|---|---|---|---|
| 6,618,734 B1* | 9/2003 | Williams et al. | 707/102 |
| 6,701,313 B1* | 3/2004 | Smith | 707/6 |
| 2001/0032112 A1* | 10/2001 | Linz | 705/8 |
| 2001/0034011 A1* | 10/2001 | Bouchard | 434/236 |
| 2001/0042000 A1* | 11/2001 | Defoor, Jr. | 705/9 |
| 2002/0026452 A1* | 2/2002 | Baumgarten et al. | 707/104.1 |
| 2002/0046074 A1* | 4/2002 | Barton | 705/8 |
| 2002/0046199 A1* | 4/2002 | Scarborough et al. | 706/21 |
| 2002/0055866 A1* | 5/2002 | Dewar | 705/8 |
| 2002/0055870 A1* | 5/2002 | Thomas | 705/10 |
| 2002/0069080 A1* | 6/2002 | Roy et al. | 705/1 |

OTHER PUBLICATIONS

McCune, Jenny C., "A few good employees," Management Review, v87n4, pp. 38-40, Apr. 1998.*

"Law Firms Automate Courting Ritual Internet Makes Recruiting Students Easier." Business Wire, Oct. 20, 1998.*

Hays, Scott, "Hiring on the Web," Workforce, v78n8, pp. 76-84, Aug. 1999.*

Tyler, Kathryn, "Put Applicants' Skills to the Test." HR Magazine, Jan. 2000.*

"iResumix Provides One-Stop Shopping for Strategic Staffing and Recruiting Needs." Business Wire, Jan. 10, 2000.*

Borck, James R. "Recruiting systems control resume chaos—A new generation of Web-based solutions streamline the recruiting process, cutting costs and time to hire." InfoWorld, Jul. 24, 2000.*

U.S. Non-Provisional of Provisional U.S. Appl. No. 60/204,776, filed May 17, 2000.* www.Intellimatch.com.*

"Intellimatch Moves Recruiting into the 21st Century with New Online Matching Technology," Press Release (www2.intellimatch.com/p-reles1.html), Sep. 23, 1996.*

Non-provisional of provisional U.S. Appl. No. 60/211,044, filed Jun. 12, 2000.*

(www.accuhire.com, Retrieved from Internet Archive Way Back Machine <www.archive.org>, includes Website Upload Date stamp Screenshot Jun. 20, 2000).*

* cited by examiner

SYSTEM AND METHOD FOR AUTOMATED SCREENING AND QUALIFICATION OF EMPLOYMENT CANDIDATES

TECHNICAL FIELD

The present invention relates in general to a system and method for screening and qualifying employment candidates, and in specific to a system and method which provide a computer program that enables an employer to generate a customized application for automatically screening and qualifying candidates for employment with the employer or for further consideration of such candidates for employment with the employer.

BACKGROUND

Recruiting and hiring qualified candidates is a vitally important task for employers. Many employers are constantly seeking to hire qualified candidates to fill available positions with the employers' companies. Such available positions may be a result of an increase in productivity of the employer requiring growth in the number of employees, loss of employees (e.g., employees retiring or otherwise having their employment with the employer's company terminated), creation of a new position within the employer's company, or a variety of other reasons. It should be understood, of course, that when referring herein to an employer or an employer's company, such reference is intended to encompass not only incorporated businesses, but is also intended to encompass any other type of business desiring to hire qualified employees.

Generally, two steps are required in obtaining qualified employees: candidate generation and candidate (or "applicant") processing. The candidate generation step is responsible for attracting and/or identifying candidates for an employer. Candidate generation may be accomplished in a variety of ways, such as through direct solicitation of candidates (e.g., contacting persons directly in an attempt to lure such persons into becoming candidates), indirect solicitation of candidates (e.g., advertising a job opening), and the employer's presence at job fairs, as examples. Candidates may approach an employer seeking a position with the employer, without the employer having actively attempted to "generate" such candidate. That is, candidates may be "generated" without requiring an employer to actively pursue such candidates through the above-mentioned methods. Furthermore, candidates for a position with an employer may already be employed in another position with the employer. For example, an employee in one position with the employer may be a candidate for another position in order to seek an increase in salary, increase in responsibility, decrease in the number of required work hours, etcetera. Thus, as used herein the term "candidates" is not intended to be limited only to persons that are not employed by an employer, but is intended to broadly encompass any person that is interested in applying for a particular position with the employer.

Once a candidate is generated for an employer, the candidate processing step begins. Candidate processing includes screening, evaluating, and qualifying generated candidates for available employment positions. Such candidate processing may include multiple levels (or steps) of processing in order to determine whether generated candidates qualify for available employment positions. As an example of candidate processing, suppose an employer has a particular position available, and the employer requires an employee that is, at a minimum, a high school graduate to fill the position. Thus, generated candidates must be screened in order to determine whether each candidate satisfies the minimum criteria (e.g., being a high school graduate) in order to qualify for the available position. Of course, such screening may be utilized to determine whether generated candidates satisfy any number of criteria required by an employer, such as candidate's education level, candidate's experience level, candidate's license (e.g., license to practice law in a particular state), candidate's language skills (e.g., whether the client is bi-lingual), and candidate's computer skills, as examples.

Typically, such candidate screening is utilized to identify qualified candidates, whom may then be considered for employment. For example, once a candidate is identified as being qualified, the candidate may be offered a position of employment with the employer. On the other hand, once a candidate is identified as being qualified, the candidate is more typically passed through additional level(s) of screening (e.g., personal interviews with the employer) before the employer determines whether to offer employment to the qualified candidate.

In the prior art, human resources are generally required for performing the candidate processing step described above. That is, human resources, such as employees of the employer are typically utilized to interview generated candidates to determine whether such candidates qualify for a position with the employer, i.e., determine whether such candidates satisfy the minimum criteria required by the employer. Generated candidates may be asked to complete questionnaires, and human resources may then be used to review the responses to the questionnaires to determine whether each candidate qualifies for a position with the employer. Once it is determined that a candidate does qualify for a position, the human resources performing the candidate processing task may then notify the candidate, schedule an interview between the candidate and a hiring manager, and forward information about the candidate (e.g., resume, writing sample, etc.) to the hiring manager.

Because all of the generated candidates will likely not qualify, the candidate processing task may reduce a very large number of generated candidates down to a much more manageable number of "qualified" candidates for consideration by the hiring manager. It should be understood that successful candidate generation ideally generates a very large pool of candidates for the employer, which is generally desirable to enable the employer a broad range of candidates from which to select for employment. It should also be understood that serious consideration of every generated candidate (e.g., a personal interview between the hiring manager and every generated candidate) would be very inefficient (and likely impossible for a very large number of generated candidates), in that many candidates generated may not satisfy the minimum criteria required for a position with the employer (i.e., may not "qualify" for a position with the employer). Thus, the candidate processing task allows increased efficiency in the overall hiring process in that "qualified" candidates from a generated pool of candidates are first determined, and only those qualified candidates are then seriously considered for a position with the employer.

Using the existing technique for candidate processing, there are a number of issues and problems that arise. First, depending on the infrastructure of the employer, a number of human resources are required for performing the candidate processing in order to determine the qualified candidates from a generated pool of candidates. Depending on the volume of generated candidates, the number of positions the employer desires to fill, and the variety in the qualification criteria for each position, inter alia, a relatively large number of human resources may be required. Requiring such a large number of human resources for performing this candidate processing task is generally undesirable in that it is inefficient because the human resources may be better utilized performing other tasks. Additionally, requiring such a large number of human resources for candidate processing is not cost effective because an employer is required to pay the large number of human resources for performing candidate processing. Thus, it may be very costly for employers to recruit and process candidates in order to fill available positions, and much of the employer's financial incentive for hiring a new employee for a position may be lost in the cost of processing candidates for the position.

Additionally, the quality and/or consistency of candidate processing of the prior art is problematic. That is, the human resources may be very inconsistent in performing the candidate processing task, which may lead to an ad hoc process of qualifying candidates. For example, utilizing human resources for candidate processing allows for discrimination in that the human resources may determine particular candidates unqualified based on criteria other than the qualification criteria established by the employer. Additionally, prior art candidate processing techniques are problematic in that they typically do not notify non-qualifying candidates of the reasons that they do not qualify for a position. Thus, candidates are left to speculate as to reasons for their not qualifying, and the employer may be left with no or little explanation as to why a particular candidate did not qualify, which may make it difficult for an employer to respond to claims of employment discrimination. Furthermore, if reasons for not qualifying are provided to a candidate, the reasons may be inaccurate, as human resources introduce the possibility of error into the processing task.

Furthermore, the time required for processing candidates is problematic. Utilizing the prior art technique, an undesirably long time is required for processing candidates, which delays the time required for hiring a candidate for a position. For example, human resources may be required to interview and/or review resumes and/or screen questionnaires of many generated candidates. The time required for the human resources to screen each candidate and determine the qualifying candidates may be undesirably long. Often, an employer may desire to fill an available position as soon as possible, and the lengthy time typically required for candidate processing conflicts with this desire.

Additionally, once qualifying candidates are identified, the human resources are often required to take subsequent actions, such as contacting a candidate to notify the candidate whether he/she qualifies for a position with the employer, scheduling an interview between the qualifying candidates and a hiring manager, and forwarding information about the qualifying candidates (e.g., resumes, questionnaires, writing samples, letters of recommendation, etcetera) to the hiring manager to assist the hiring manager in his/her consideration of each candidate. Thus, such subsequent actions may require further human resources, thereby adding to the cost and inefficiency discussed above, and additional time required for the processing of candidates.

SUMMARY OF THE INVENTION

In view of the above, a desire exists for a candidate qualification system and method that reduce the number of human resources required for candidate processing, such as determining the qualification of candidates. A further desire exists for a candidate qualification system and method that process candidates efficiently and cost effectively. Still a further desire exists for a candidate qualification system and method that process candidates in an accurate and consistent manner. Yet a further desire exists for a candidate qualification system and method that enable processing of candidates in a timely manner.

These and other objects, features and technical advantages are achieved by a system and method which assist an employer in determining qualified candidates for positions of employment with the employer in an efficient and cost-effective manner. A preferred embodiment of the present invention provides a software product that enables employers to generate a customized application program executable to interact with candidates and determine the qualified candidates for a position with the employer. More specifically, the software product receives as input from the employer a desired hiring criteria, and then generates a customized application program that utilizes the desired hiring criteria to determine the qualified candidates for the employer. In a most preferred embodiment, the application program may, upon determining a qualified candidate, take actions necessary to assist in further consideration of the qualified candidate. As an example, the application program may access a hiring manager's calendar, and schedule an interview for the qualified candidate at an available time. As a further example, the application program may forward information about the qualified candidate (e.g., resume, responses of the candidate to a questionnaire conducted by the application program, writing sample, letters of recommendation, etcetera) to the hiring manager via e-mail, fax, or some other method of communicating data.

A preferred embodiment allows for employers to generate an application program, with which candidates may interact to effectively self-administer a qualification session for a position with the employer. Thus, the application program may be referred to herein as a SAQ (self-administered qualification) program. Because the application program of a preferred embodiment allows for candidates to self-administer the qualification process, human resources required for conducting such qualification (e.g., candidate processing) may be reduced or eliminated. Additionally, the SAQ program of a preferred embodiment enables candidates to be evaluated (or screened) in an accurate, consistent, and timely manner. Thus, a preferred embodiment may allow for candidate processing (e.g., determining whether candidates are qualified for employment or for further consideration for employment) to be achieved efficiently, accurately, and cost effectively. Various exemplary implementations are disclosed in greater detail hereafter in order to render the disclosure enabling to one of ordinary skill in the art.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
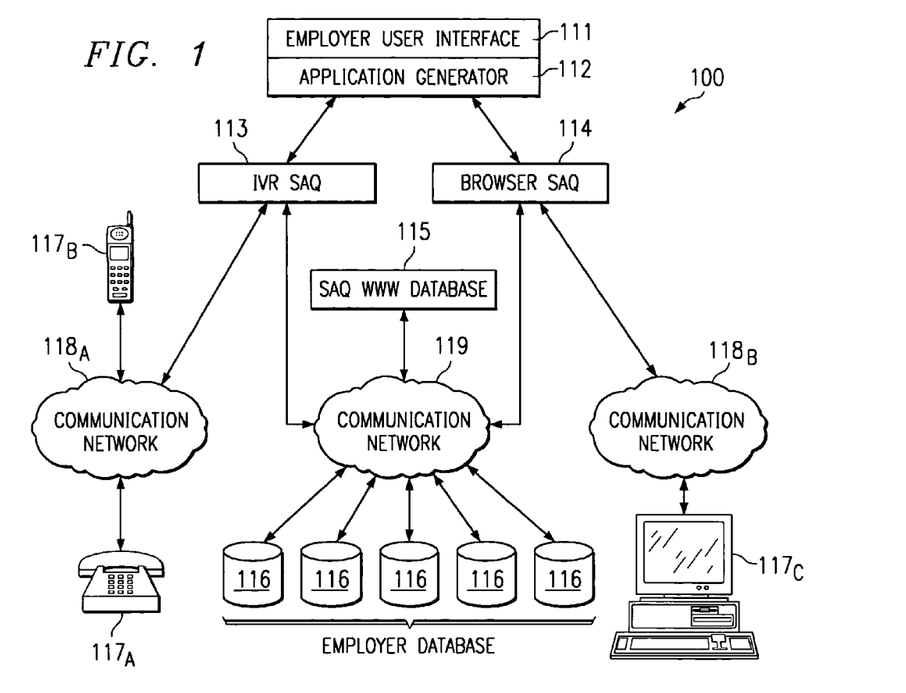
FIG. 1 shows an exemplary environment in which a preferred embodiment of the present invention may be implemented.

Turning to FIG. 1, an exemplary environment in which a preferred embodiment may be implemented is shown. As shown, environment (or "system") 100 may include one or more computer devices on which the various components of a preferred embodiment (described hereafter) may be implemented. It should be understood that as used herein, the terms "computer" and "computer devices" are intended to broadly refer to any type of processor-based devices, including but not limited to personal computers (PCs), workstations, laptop computers, personal digital assistants (PDAs), and computer servers. Executing in environment 100 is an employer user interface 111 and application generator 112. Employer user interface 111 and application generator 112 may both be part of a computer executable software program accessible by an employer, or such components may be separate computer executable programs capable of communicating therebetween. Employer user interface 111 preferably comprises computer executable software code that provides a user interface between the application generator 112 and an employer. Preferably, an employer may interact with employer user interface 111 to input the employer's desired hiring criteria, as well as other information, such as the employer's preferences regarding the SAQ program's operation (e.g., whether the SAQ program is to automatically schedule qualified candidates for an interview, whether the SAQ program is to request information, such as a resume, writing sample, and/or letters of recommendation are requested from qualified candidates and forward such information to a hiring manager). An employer may specify various hiring criteria for qualifying a candidate for a particular position, such as the candidate's education level and experience, as examples.

Once the employer interacts with the employer user interface 111 to provide the employer's desired hiring criteria, such hiring criteria information is utilized by the application generator 112 to generate a SAQ program. Accordingly, in a preferred embodiment, the generated SAQ program is customized (or "tailored") for the employer's particular hiring criteria/preferences. The generated SAQ program(s) are then accessible by candidates, and are executable to screen candidates based on the employer's hiring criteria to determine whether each of the candidates are qualified for a position of employment with the employer. As shown in the exemplary implementation of FIG. 1, application generator 112 may generate one or more various types of SAQ programs. That is, application generator 112 may generate multiple SAQ programs that each enable a different format (or platform) in which a candidate may interact with such SAQ programs. For example, an interactive voice response (IVR) SAQ program 113 may be generated to enable candidates to access such SAQ program 113 via a telephone interface. IVR programs with which users can interact via a telephone interface are well known in the art, and one of ordinary skill in the art would recognize the programming code necessary for implementing an IVR SAQ 113. As is well known in the art, an IVR program may interact with a caller by recognizing dual-tone multi-frequency ("DTMF") signals and/or speech from a caller and output speech to the caller. As discussed above, in a preferred embodiment, application generator 112 generates the code for implementing IVR SAQ 113 in accordance with the hiring criteria desired by the employer. The generated IVR SAQ 113 would preferably have access to a DTMF decoder, speech recognition system, and/or other hardware/software to assist in the interaction with a candidate via telephone.

As another example, a browser-based SAQ program 114 may be generated to enable candidates to access such SAQ program 114 via a standard web browser, such as Netscape or Explorer, as examples. Web-based programs with which users can interact via a standard web browser are well known in the art, and one of ordinary skill in the art would recognize the programming code necessary for implementing a web-based SAQ 114. As discussed above, in a preferred embodiment, application generator 112 generates the code for implementing web-based SAQ 114 in accordance with the hiring criteria desired by the employer. Of course, various other SAQ programs enabling other formats (or platforms) for candidates to access such SAQ programs may be generated, and any such SAQ programs are intended to be within the scope of the present invention. For instance, application generator 112 may generate a SAQ program to be implemented on a stand-alone PC or a workstation coupled to a local area network (LAN) or wide area network (WAN), as examples, for interacting with candidates having access to such PC or workstation.

Once application generator 112 generates the SAQ programs (e.g., IVR SAQ 113 and web-based SAQ 114), a candidate may utilize an appropriate device to access such SAQ programs. For example, a candidate may utilize a telephone (e.g., standard telephone $117_A$ or cellular telephone $117_B$) to access IVR SAQ 113 via communication network $118_A$, which may be any suitable network for allowing communication between such devices and SAQ program 113, including but not limited to a public switched telephone network (PSTN), voice-over-the-Internet, or wireless communication network. A candidate may utilize such devices to interact with IVR SAQ 113 in an attempt to qualify for a position with an employer. As another example, a candidate may utilize a computer (e.g., PC, laptop, PDA, etcetera) $117_C$ to access web-based SAQ 114 via communication network $118_B$, in order to interact with such web-based SAQ 114 in an attempt to qualify for a position with an employer. It should be understood that communication network $118_B$ may comprise any means of information communication, such as a PSTN, wireless communication network, a proprietary network, a general purpose processor-based information network, dedicated communication lines, a computer network, direct PC to PC connection, a LAN, a WAN, modem to modem connection, the Internet, an Intranet, an Extranet, or any combination thereof suitable for providing information communication between a particular network element $117_C$ and web-based SAQ 114.

As described in greater detail hereafter, in a preferred embodiment, a generated SAQ program interacts with a candidate to determine whether a candidate qualifies for a position with an employer. In a most preferred embodiment, information about a candidate obtained by the SAQ program may be stored in a database for future reference by the employer and/or the SAQ program. For instance, a database may be maintained for the individual employer (e.g., on the employer's computer equipment), such as employer databases 116, to which information may be communicated from SAQ programs via, for example, communication network 119, such as the Internet, a WAN, or a LAN, as examples.

Alternatively, a database may be maintained by a third-party provider, such as SAQ database 115, to which information may be communicated from SAQ programs via, for example, communication network 119. For example, in one embodiment, a third-party provider may provide access to application generator 112 for an employer via, for example, the Internet (or some other communication network). Such third-party provider may then allow access to generated SAQ programs to candidates, and may store information from such SAQ programs in SAQ database 115. For instance, in one implementation, a third-party provider may implement a web server computer (not shown in FIG. 1) on which employer user interface 111 and application generator 112 execute. An employer may access the web server via the Internet (e.g., via the World Wide Web) to access employer user interface 111. Furthermore, in this implementation application generator 112 may generate SAQ programs customized for the employer (e.g., IVR SAQ 113 and web-based SAQ 114), which may then reside on the same or different web server of the third-party provider. The third-party provider may then allow candidates to access the generated SAQ programs, and the third-party provider may store information from such SAQ programs in SAQ database 115, which may, for example, be communicatively coupled to the third-party provider's web server. Such an implementation, as well as further exemplary implementations, are described in greater detail hereafter.

Figure 2:
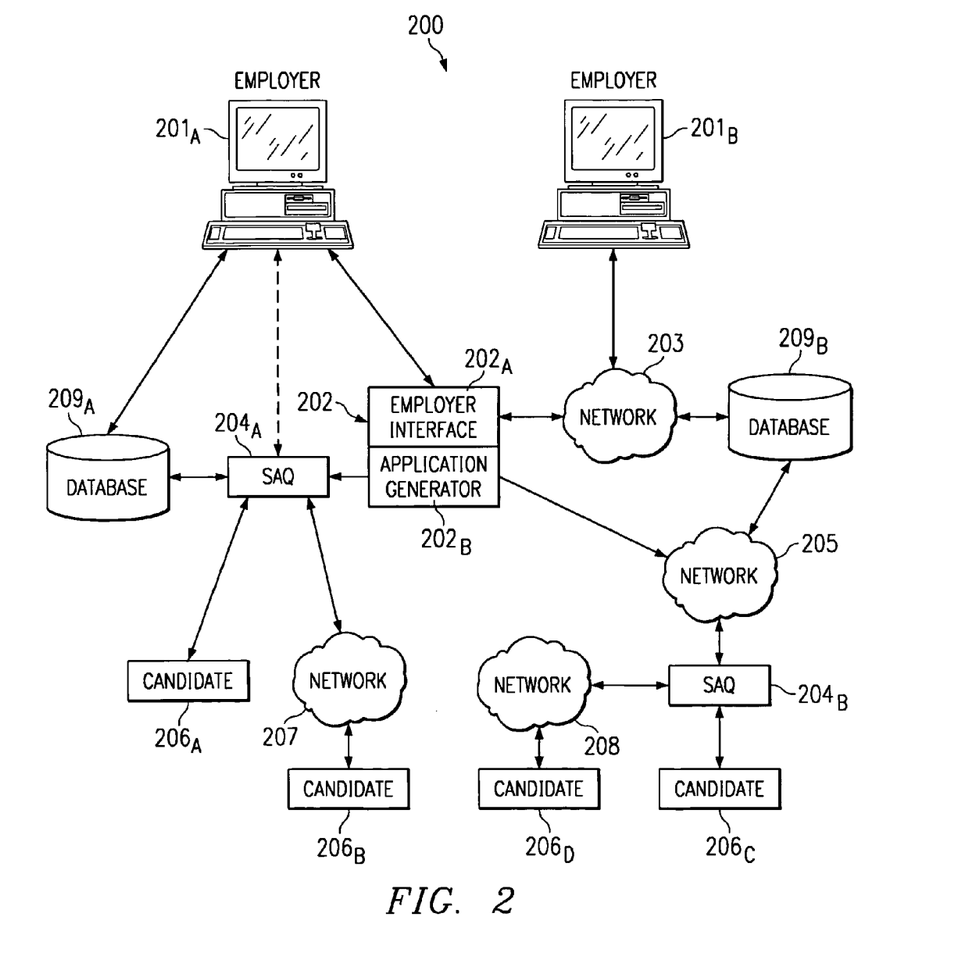
FIG. 2 shows a further exemplary environment in which a preferred embodiment of the present invention may be implemented.

Turning to FIG. 2, a further exemplary environment 200 in which a preferred embodiment may be implemented is shown. As shown, within environment (or "system") 200, one or more employers may have access to an application generator program 202 via a computer device, such as computers $201_A$ and $201_B$. As shown with computer $201_A$, in one embodiment an employer may have direct access to program 202. For example, the computer executable program 202 may be stored on a data storage device of computer $201_A$ (e.g., its hard drive, floppy drive, CD-ROM drive, or other data storage device) and be executable by the processor of computer $201_A$. Of course, in this implementation, some or all of the computer executable program 202 may be stored on and/or executing on a peripheral device to which computer $201_A$ is coupled to allow for direct communication therebetween, such as an external data storage device.

As shown with computer $201_B$, in another embodiment an employer may have access to program 202 via communication network 203. As with communication network $118_B$ discussed above with FIG. 1, communication network 203 may be any suitable type of communication network to enable communication between computer $201_B$ and program 202. With this implementation, program 202 may be stored on a data storage device of a computer (not shown) and executable by the processor of such computer, wherein such computer is communicatively coupled to network 203. Thus, program 202 may be executing on a computer (e.g., a server computer) that is communicatively coupled to network 203 in a manner that allows computer $201_B$, which may be remote therefrom, to access program 202 via network 203. In a most preferred embodiment, program 202 may be accessible by one or more employers via the Internet 203, or program 202 may be accessible by an employer via the employer's Intranet 203.

As discussed above with FIG. 1, in a preferred embodiment, program 202 includes an employer user interface $202_A$ and application generator $202_B$. Employer user interface $202_A$ preferably comprises computer executable software code that provides a user interface between the application generator $202_B$ and an employer. Preferably, an employer may interact with employer user interface $202_A$ to input the employer's desired hiring criteria, as well as other information, such as the employer's preferences regarding the SAQ program's operation, and such information is then utilized by application generator $202_B$ to generate a customized SAQ program for the employer. Program 202 may be thought of as being somewhat analogous to a presentation generation program, such as Microsoft PowerPoint™, which enables a user to "build" a customized presentation application. Program 202 is somewhat analogous in that it enables an employer to effectively "build" or generate a customized SAQ by providing its hiring criteria and preferences to program 202. Although, in a preferred embodiment, program 202 generates a SAQ program that is much more sophisticated than a typical presentation application, in that the generated SAQ program, inter alia, interacts with candidates and determines, based on input from the candidates, whether each candidate qualifies for employment with a particular employer. As discussed with FIG. 1 above, in a preferred embodiment, application generator $202_B$ may generate one or more various types of SAQ programs (e.g., IVR SAQ, web-based SAQ, etc.), as desired by the employer.

It should be recognized that application generator $202_B$ may be implemented to generate a SAQ program locally to the computer on which application generator $202_B$ is executing, and/or generate a SAQ program that is then transmitted via a communication network to another computer for execution thereon. For example, as shown in the exemplary implementation of FIG. 2, application generator $202_B$ may generate SAQ program $204_A$ and/or $204_B$. As shown with SAQ program $204_A$, in one embodiment application generator $202_B$ may generate such SAQ program $204_A$ local to the computer on which application generator $202_B$ is executing, which as discussed above may be an employer's computer (e.g., computer $201_A$) or a computer server accessible by an employer via a network (e.g., network 203). Thus, for example, application generator $202_B$ may be executing locally on employer computer $201_A$, and generate SAQ program $204_A$ local thereto, such that an employer may have direct access to SAQ program $204_A$. For instance, SAQ program $204_A$ may be stored on a data storage device of computer $201_A$ and executable by the processor of computer $201_A$. As a further example, application generator $202_B$ may be executing remotely from employer computer $201_B$ (e.g., on a remote computer server), which is capable of accessing program 202 via network 203, and application generator $202_B$ may generate SAQ program $204_A$ local to the computer on which application generator $202_B$ is executing, such that an employer may be capable of accessing SAQ program $204_A$ from remote computer $201_B$ via network 203. For instance, SAQ program $204_A$ may be stored on a data storage device of a remote computer server and executable by the processor of such remote computer server, wherein the remote computer server is communicatively coupled to network 203.

As further shown in the exemplary implementation of FIG. 2, in another embodiment application generator $202_B$ may generate SAQ program $204_B$, which is then transmitted via a communication network to another computer for execution thereon. Thus, for example, application generator $202_B$ may be executing locally on employer computer $201_A$, and generate SAQ program $204_B$, which may be transmitted via network 205 to another computer. For example, an employer may have one computer (e.g., computer $201_A$) within its organization for generating SAQ programs, and may have outlying computers accessible by candidates for executing the generated SAQ programs. Thus, computer $201_A$ may be utilized to generate a customized SAQ program, which may then be transmitted via network 205 to the outlying computers for access by candidates. Such transmission of SAQ program $204_B$ over network 205 may be initiated by application generator $202_B$ or by an employer, as examples.

As a further example, application generator $202_B$ may be executing remotely (e.g., on a remote computer server) from employer computer $201_B$, which is capable of accessing program 202 via network 203, and application generator $202_B$ may generate SAQ program $204_B$, which may be transmitted via network 205 to a different computer than that on which program 202 is executing. For instance, generated SAQ program $204_B$ may be transmitted via network 205 to the employer's computer $201_B$ (or other computer(s) local to the employer's organization), whereat generated SAQ program $204_B$ may be executed to enable self-qualification by candidates. In this manner, network 203 and 205 may logically and/or physically be the same network.

Once a SAQ program is generated, such as SAQ programs $204_A$ and $204_B$, candidates may be allowed access to the SAQ program to attempt to qualify for employment with an employer. As shown in the exemplary implementation of FIG. 2, candidates $206_A$ and $206_B$ may access SAQ program $204_A$, and candidates $206_C$ and $206_D$ may access SAQ program $204_B$. As further shown, candidates $206_A$ and $206_C$ may directly access their respective SAQ programs, while candidates $206_B$ and $206_D$ may access their respective SAQ programs from a remote location via a communication network (e.g., communication networks 207 and 208). As described in greater detail hereafter, communication networks 207 and 208 may be any suitable communication network for allowing communication between a candidate's device (e.g., telephone or computer) and the particular SAQ program being accessed.

As an example, an employer may provide designated computer terminals (e.g., at the employer's place of business, at a job fair, etcetera) which execute a generated SAQ program, and candidates, such as candidates $206_A$ and $206_C$, may directly interface with such designated computer terminals to interact with the SAQ program. As an alternative example, an employer (or a third-party provider) may provide a server computer which executes the generated SAQ program, and candidates, such as candidates $206_B$ and $206_D$, may interact with the SAQ program from a remote location via a communication network (e.g., communication networks 207 and 208). For instance, candidate $206_B$ may use a telephone and access SAQ program $204_A$, which may be an IVR SAQ program, via communication network 207 (e.g., a PSTN or wireless communication network). Furthermore, candidate $206_D$ may use a computer device and access SAQ program $204_B$, which may be a web-based SAQ program, via communication network 208.

As discussed with FIG. 1 above, in a preferred embodiment, application generator $202_B$ may generate various SAQ programs, as desired by an employer, to allow for different platforms to be utilized by candidates to access such SAQ programs, including but not limited to computer platform and telephone platform. Additionally, as further shown in the exemplary implementation of FIG. 2, one or more databases, such as databases $209_A$ and $209_B$, may be maintained. Preferably, such databases are implemented for receiving information from a SAQ program and/or an employer, and for providing information to a SAQ program and/or an employer. Such databases may be maintained local to the SAQ program or remote therefrom, and such databases may be maintained local to the employer or remote therefrom. For example, database $209_A$ may be implemented local to both the employer (e.g., via computer $201_A$) and SAQ $204_A$, such that both the employer and the SAQ program may have direct access to database $209_A$. As an alternative example, database $209_B$ may be implemented remote from both the employer and SAQ $204_B$, such that both the employer and SAQ program $204_B$ may be capable of accessing database $209_B$ via communication networks (e.g., communication networks 203 and 205, respectively).

In a preferred embodiment databases $209_A$ and $209_B$ may be utilized to store information about each candidate, which may then be accessed by the employer and/or a SAQ program. For example, an employer may change its hiring criteria for a particular position (or have a new position come available), and the employer may query the information compiled in a database for various candidates to determine if any of such candidates are qualified. If a qualified candidate is found from the database, the employer may then contact the candidate about employment. Thus, the employer may utilize the compiled database to determine qualified candidates for positions without being required to generate new candidates to participate in a qualification session. Additionally, an employer may generate various reports from the database that may provide valuable information to the employer about its recruiting efforts. For example, an employer may generate a report that details the number of applicants that attempted to qualify for a particular position (e.g., via a customized SAQ program) within a particular time period, the number of applicants that qualified, the number of applicants that failed to qualify, and the reasons that non-qualifying applicants failed to qualify. From such information, an employer may determine, inter alia, whether its efforts to generate candidates are successful and the most common reasons for candidates failing to qualify, which may lead an employer to re-evaluate its hiring criteria for a particular position.

Furthermore, such databases $209_A$ and $209_B$ may be accessed by the SAQ program to allow the SAQ program to store and retrieve information. For example, the SAQ program may allow a candidate to save his/her qualification session before completion, and then re-access such session at a later time. The SAQ program may save the candidate's session to the database, and upon identifying the candidate at a later time using a unique identifier, such as a social security number or (randomly) assigned unique identification code, allow the candidate to continue with an earlier qualification session. Additionally, the SAQ program may access the database to determine information about candidates that attempt to qualify for a position with an employer multiple times. For example, the SAQ program may identify a candidate (e.g., based on his/her SSN or other type of identification code assigned to the candidate), as a candidate that attempted to qualify for the exact same position just one day earlier, and in response the SAQ program may not allow the candidate to attempt to qualify again, or may take some other action (e.g., notify the appropriate hiring personnel). As a further example, the SAQ program may identify a candidate (e.g., based on his/her SSN), and determine information that is inconsistent with information provided by the candidate in an earlier qualification session. For example, the candidate may indicate in a first qualification session that he/she has no experience in a particular position, and in a qualification session conducted the next week the same candidate may indicate that he/she has two years of experience in the position. The SAQ program may include this information in information transmitted to hiring personnel to place the hiring personnel on notice of the inconsistency, or may notify the candidate of the inconsistent response and ask the candidate to verify the correct response (or simply not allow the candidate to continue with the qualification session). Thus, the databases may be very useful both for the employer and for the customized SAQ programs.

In a most preferred implementation, program 202 is executable on a web server (e.g., on a third-party provider's web-server) to enable employers access to such program 202 via the Internet (e.g., via the World Wide Web). Employers may interact with program 202 to generate customized SAQ program(s), which may then be accessible by candidates via the Internet or other communication network. In an alternative embodiment, program 202 is executable on an employer's Intranet to allow the employer to generate customized SAQ program(s) that may then be accessible by candidates via the employer's Extranet or other communication network.

Figure 3:
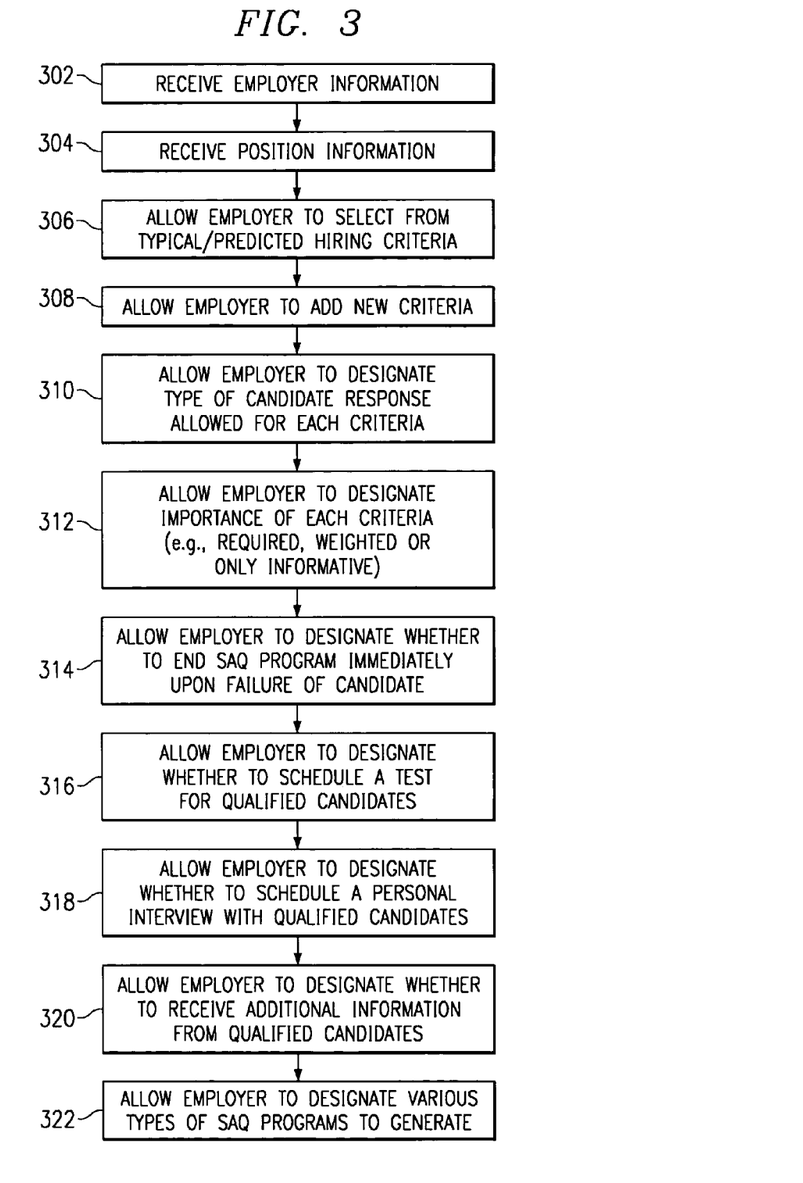
FIG. 3 shows an exemplary flow diagram for the operational flow of a user interface for receiving hiring criteria from an employer.

Turning now to FIG. 3, an exemplary flow diagram is shown for the operational flow of program 202, and more specifically for employer interface $202_A$. As shown, in block 302 the user interface receives employer information, such as the employer's name, address, logo, company profile information, etcetera. Of course, such information may include company specific information that the employer deems helpful in marketing the company to prospective employees. This information may be input by the employer, or the user interface may receive the information from a designated file (e.g., from a database file that maintains information about the employer). At block 304, the user interface receives information about the positions available with the employer, such as the title of each position, salary for each position, etcetera. As with the employer information, the available position information may be input by the employer, or it may be received from a designated file.

At block 306, the user interface may allow an employer to select from typical hiring criteria commonly used for qualifying applicants. That is, the user interface may provide predetermined or predicted hiring criteria for selection by an employer. For example, employers commonly include education level as a criteria for qualifying for positions. For instance, an employer may require that a candidate have at least a high school education to qualify for one position, at least a two-year college degree to qualify for another position, at least a four-year college degree to qualify for still another position, and at least a master's degree to qualify for yet another position. Thus, the user interface may enable the employer to select education level as a criteria to be included in screening a candidate. Because education level is commonly utilized for qualification, it may be provided for selection by an employer (e.g., from a list of available predetermined criteria). Providing such commonly utilized criteria may assist an employer in quickly determining the type of criteria that the employer would like to include for a particular position. That is, the user interface may aid the employer by reminding the employer of such commonly used hiring criteria, and allow the employer to easily and quickly implement desired criteria into the employer's customized qualification program.

At block 308, the user interface may allow an employer to add the employer's own hiring criteria, which may not have been included in the predetermined/predicted set of hiring criteria provided for selection by the user interface. That is, the user interface may allow an employer to specify hiring criteria that is not available for selection from the predetermined/predicted set of hiring criteria of the user interface. For example, an employer may want to know whether a candidate for a particular position is a current employee of the employer (e.g., in some other position), or an employer may want to know whether a candidate is related to a current employee of the employer. Such criteria may not be included within the set of commonly utilized criteria. Thus, the user interface preferably allows the employer to enter its own specific criteria in block 308.

At block 310, the user interface may allow an employer to designate the type of candidate response that is to be allowed for each criteria. For example, an employer may designate that the candidate be allowed to respond to a question about a particular hiring criteria with, for instance, Yes/No, True/False, selecting an answer from a multiple choice list, or by providing an essay response. Thus, the employer may be able to designate the type of response options for a particular hiring criteria. For example, the employer may include education level as a hiring criteria. Furthermore, the employer may designate that the candidate respond with yes/no. For instance, the SAQ application may ask the candidate "have you graduated from high school?" Thus, allowing for a Yes/No answer. Alternatively, the employer may designate that the candidate respond by selecting from a group of multiple choice answers. For instance, the SAQ application may ask the candidate "what is the highest level of education you have achieved?" The SAQ application may further present the candidate with multiple choice answers from which a candidate may select his/her response. Further still, an employer may query a candidate as to "why do you desire a position with us?" The SAQ program may allow the candidate to provide an essay response to this question.

At block 312, the user interface may allow an employer to designate the importance of each hiring criteria. For example, the employer may be able to designate each criteria as being either absolutely required for qualification, having a weighted value, or as merely informative. For instance, the employer may designate that the candidate absolutely must have at least a high school education in order to qualify for a particular position. Alternatively, having a high school education may be allocated a particular weighted value, and the sum of all weighted criteria may be required to be greater than a particular value for a candidate to qualify. Additionally, the employer may designate particular criteria as being merely informative, wherein the SAQ program may store the candidate's response but not use it in determining whether the candidate qualifies for a particular position. For instance, as discussed above, the employer may customize the SAQ program to allow the candidate to answer certain questions in essay form. Those responses may be designated as informative only. In fact, the user interface may require that essay responses be designated as informative only because of the difficulty in generating a SAQ program capable of determining whether an essay response satisfies a particular criteria of the employer. As discussed in greater detail below, such informative responses may be stored and forwarded to an interviewer for a qualified candidate to provide such interviewer additional information about a qualified candidate prior to a personal interview.

At block 314, the user interface may allow the employer to designate whether the SAQ program is to terminate immediately upon failure of a candidate, or whether the SAQ program is to continue to gather information for all of the desired hiring criteria for a candidate. For example, suppose that an employer specifies that at least a high school education is required for qualifying for a particular position. One of the first questions presented by a generated SAQ to a candidate may be "Are you a high school graduate?" (or similar language). If a candidate indicates that he/she is not a high school graduate, the SAQ program can immediately determine that the candidate fails to qualify for the position. Thus, SAQ program may immediately notify the candidate that he/she failed to qualify and terminate the session. However, an employer may desire to have the SAQ program continue, in order to gather additional information about the candidate. For instance, information may be stored in a database, such as databases $209_A$ and $209_B$ of FIG. 2, and an employer may later query the database of previously screened candidates. For example, an employer may change its hiring criteria to no longer require a high school education for the available position (or have a new position come available that does not require a high school education), and the employer may query the database of previously screened candidates with the new hiring criteria (e.g., wherein a high school education is not required) to immediately generate qualified candidates without being required to generate candidates to participate in another qualification session. Thus, a preferred embodiment allows for an employer to designate, at block 314, whether to end a qualification session immediately upon determining a candidate does not qualify.

At block 316, the user interface may allow the employer to designate whether the SAQ program is to schedule (or to administer) a test for qualifying candidates. For example, an employer may require further screening of a qualified candidate, in that the qualified candidate may be required to take (and pass) an examination before being offered employment. In a preferred embodiment, the user interface allows the employer to designate whether to schedule such an examination for a qualified candidate. For instance, a generated SAQ program may be able to access a testing calendar maintained for the examination, and such SAQ program may interact with a qualified candidate to schedule the examination for such candidate at an appropriate time. Once scheduled, the SAQ program may be capable of updating the examination calendar to reflect the newly scheduled exam for the qualified applicant. Alternatively, the SAQ program may be capable of administering the exam. For instance, the SAQ program may be capable of initiating a testing program for testing a qualified candidate, as designated by the employer in generating the SAQ program. As a result, human resources may not be required for scheduling and/or administering an examination of qualified candidates.

At block 318, the user interface may allow the employer to designate whether the SAQ program is to schedule a personal interview with one or more hiring managers for candidates qualifying for a particular position. For example, an employer may require further screening of a qualified candidate, in that the qualified candidate may be required to undergo a personal interview with one or more hiring managers before being offered employment. In a preferred embodiment, the user interface allows the employer to designate whether to schedule such a personal interview for a qualified candidate. For instance, a generated SAQ program may be able to access a scheduling calendar maintained for hiring managers (i.e., interviewers), and such SAQ program may interact with a qualified candidate to schedule the personal interview for such candidate at an appropriate time. Once scheduled, the SAQ program may be capable of updating the interviewers' calendars to reflect the newly scheduled interview for the qualified applicant. As a result, human resources may not be required for scheduling a personal interview of qualified candidates.

At block 320, the user interface may allow the employer to designate whether the SAQ program is to allow a qualified candidate to provide additional information, such as a resume, writing sample, letters of recommendation, copy of school transcripts, etcetera. For example, an employer may desire to review such information for a qualified candidate before offering the candidate a position of employment. Thus, for instance, a SAQ program may prompt a qualified candidate to provide such supplemental information to the employer. Preferably, the SAQ program may be capable of receiving such information via fax, e-mail, digital imaging device (e.g., an optical scanner), or other suitable means, and the SAQ program may store the received information in a database record for the candidate and/or forward such information for the candidate to the appropriate personnel of the employer (e.g., hiring managers).

At block 322, the user interface may allow the employer to designate the various types of SAQ programs to be generated. For example, an employer may desire to provide candidates access to the SAQ program via telephone, via the World Wide Web, and via a designated computer in the employer's organization. As discussed above, various types of SAQ programs may be generated to allow candidates to access such SAQ programs via many different platforms. In a preferred embodiment, the user interface allows an employer to designate the desired types of SAQ programs to be generated.

It should be understood that the operational flow diagram of FIG. 3 is intended only as an example, and one of ordinary skill in the art will recognize that in alternative embodiments the order of operation for the various blocks may be varied, certain blocks of operation may be omitted completely, and additional operational blocks may be added. Thus, the present invention is not intended to be limited only to the operational flow diagram of FIG. 3 for a user interface, but rather such operational flow diagram is intended solely as an example that renders the disclosure enabling for many other operational flow diagrams for implementing the user interface. For example, further customization features may be provided to an employer by the user interface in generating a SAQ program. For instance, the user interface may allow the employer to designate the display features to be included in the generated SAQ program, such as font, size, background color, foreground color, and graphical images, as examples. As a further feature, the user interface may allow the employer to designate the order of the qualification session, such as the order of particular screens presented to a candidate by the SAQ program and/or the order of particular hiring criteria being presented to a candidate by the SAQ program. As still a further feature, the user interface may allow the employer to designate certain questions (or hiring criteria) as "follow-up questions" that are dependent on certain responses of the candidate. That is, the employer may designate that certain questions are to be presented to a candidate only if the candidate responds to a previous question in a particular manner. For example, the employer may designate that the SAQ program question the candidate as to his/her college alma mater only if the candidate responds to a previous question about the candidate's education level in a manner that indicates that the candidate has a college degree. Thus, continuing with this example, the resulting SAQ program may question the candidate as to the highest level of education achieved by him/her, and only if the candidate responds as having achieved a college degree does the SAQ program question the candidate as to which college the candidate attended.

Figure 4:
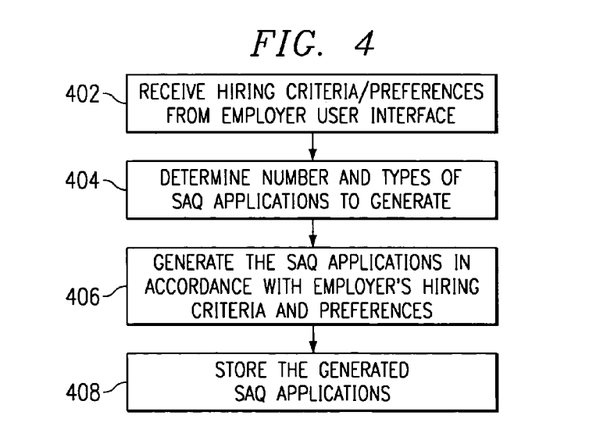
FIG. 4 shows an exemplary flow diagram for the operational flow of an application generator for generating one or more customized application programs for qualifying candidates according to an employer's hiring criteria.

Turning now to FIG. 4, a further exemplary flow diagram is shown for the operational flow of program 202, and more specifically for application generator $202_B$. As shown, in block 402, the application generator receives the hiring criteria information and employer preferences from the employer user interface $202_A$. As discussed above, some information may be input by the employer to user interface $202_A$, and other information may be received by the user interface $202_A$ from a designated file (e.g., from a database file). At block 404, the application generator determines the number and types of SAQ programs to generate. For example, as discussed above, an employer may desire to have multiple SAQ programs generated that each allow for access by a candidate via a different platform. At block 406, the application generator generates the necessary computer executable code for the desired SAQ programs in order to generate one or more SAQ programs customized based on the employer's hiring criteria and preferences. Once the SAQ programs are generated, they are stored at a designated location, at block 408, and may then be executed to enable candidates to perform self qualification.

It should be understood that the operational flow diagram of FIG. 4 is intended only as an example, and one of ordinary skill in the art will recognize that in alternative embodiments the order of operation for the various blocks may be varied, certain blocks of operation may be omitted completely, and additional operational blocks may be added. Thus, the present invention is not intended to be limited only to the operational flow diagram of FIG. 4 for an application generator, but rather such operational flow diagram is intended solely as an example that renders the disclosure enabling for many other operational flow diagrams for implementing an application generator.

Figure 5:
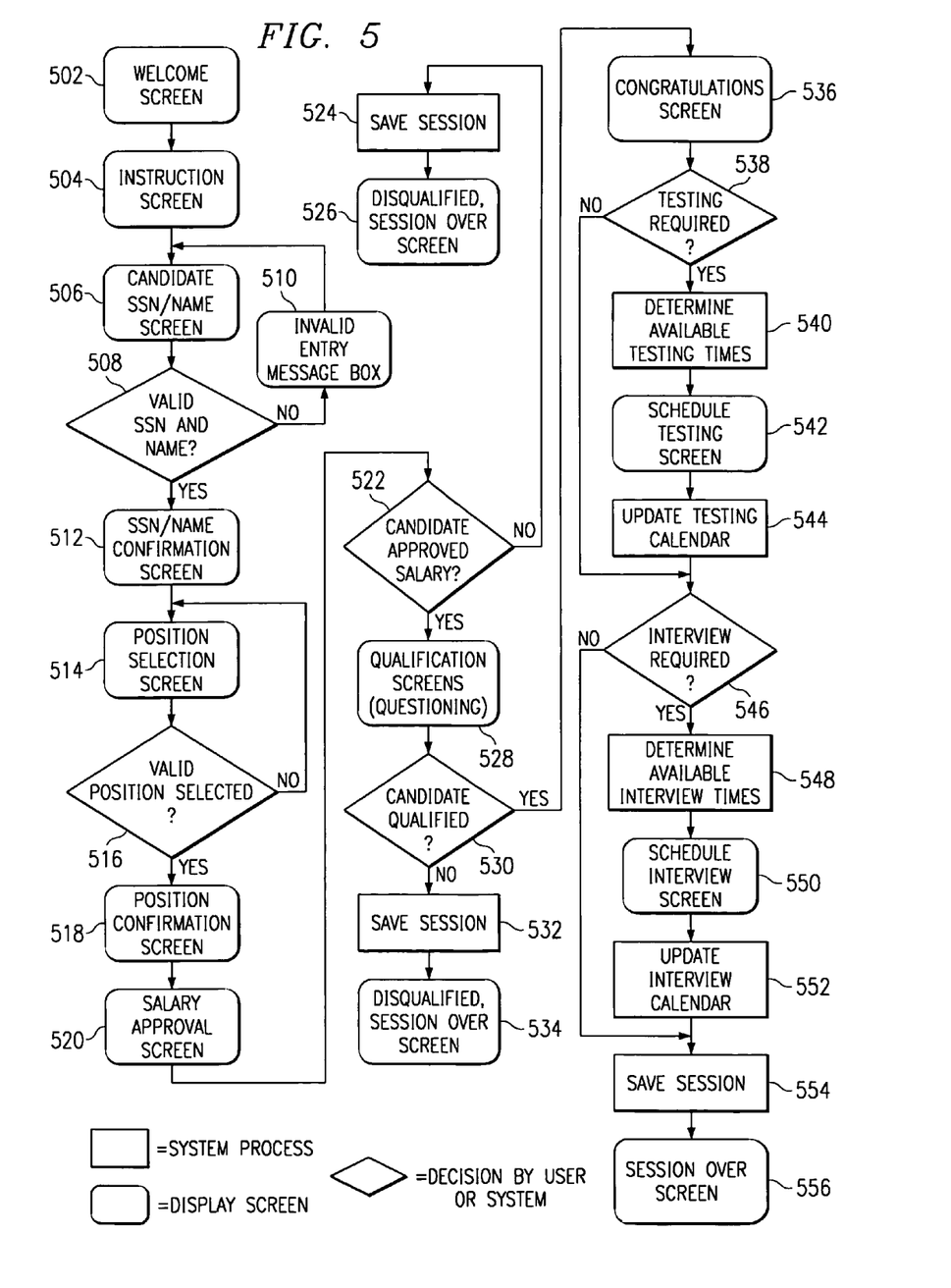
FIG. 5 shows a flow diagram for an exemplary qualification program that may be generated in a preferred embodiment.

Turning now to FIG. 5 a flow diagram for an exemplary SAQ program that may be generated in a preferred embodiment is shown. The exemplary SAQ program to which the flow diagram of FIG. 5 corresponds may be a web-based program or other type of program accessible by a candidate operating a computer device (either directly or via a communication network). Of course, as discussed above, in a preferred embodiment various other SAQ programs that allow candidates access via many different platforms may be generated for an employer. In the exemplary SAQ program of FIG. 5, a candidate is presented a "welcome" screen at block 502. At block 504, a candidate is presented an instruction screen informing the candidate how to use the SAQ program. At block 506, the SAQ program prompts the candidate for identifying information, such as the candidate's name and social security number (SSN). Once receiving such information from a candidate, the SAQ program may, at block 508, determine whether valid information has been provided (e.g., a valid name and/or valid SSN). For instance, a SSN having only two digits (e.g., "25") may be determined to be an invalid SSN. If determined that valid information has not been provided by the candidate, the SAQ program may present the candidate an "invalid entry" message box at block 510, and return its operation to block 506 to again request the candidate for identifying information.

Once valid identifying information is received from the candidate, the SAQ program may display a confirmation screen at block 512, which may display the received information to the candidate to allow the candidate to verify/confirm that the received information is correct. Once the candidate confirms that the received information is correct, the SAQ program advances its operation to block 514, wherein the SAQ program presents the candidate an interface for selecting a desired position with the employer. Once receiving an indication of the desired position from the candidate, the SAQ program may, at block 516, determine whether a valid position has been provided by the candidate. For instance, the candidate may select a position for which the employer does not have an opening for employment, which may be determined to be an invalid position. If determined that valid information has not been provided by the candidate, the SAQ program may present the candidate an "invalid entry" message box, and return its operation to block 514 to again request the candidate for a desired position.

Once a valid position is received from the candidate, the SAQ program may display a confirmation screen at block 518, which may display the received position to the candidate to allow the candidate to verify/confirm that the received position is actually the position for which the candidate desires to apply/qualify. Once the candidate confirms that the received position is correct, the SAQ program advances its operation to block 520, wherein the SAQ program may present the candidate information about compensation provided by the employer for the selected position (e.g., the starting salary paid by the employer for the selected position). The SAQ program may present the candidate an interface for indicating whether he/she approves (e.g., is willing to accept) the compensation being offered by the employer for the selected position. At block 522, the SAQ program may determine whether the candidate approves of the employer's compensation. If determined that the candidate does not approve of the compensation, the SAQ program may save the candidate's session (i.e., save the information obtained up to that point about the candidate) at block 524, which may include saving such session information to a database, such as databases $209_A$ and $209_B$ of FIG. 2. Thereafter, the SAQ program may notify the candidate that he/she does not qualify for the position and terminate the session, at block 526.

If it is determined at block 522 that the candidate approves the employer's compensation, then the SAQ program advances its operation to block 528, whereat the SAQ program presents various hiring criteria questions to the candidate. Of course, such hiring criteria questions are preferably customized to accurately reflect the employer's hiring criteria for the selected position. More specifically, as discussed above, an employer preferably utilizes employer interface $202_A$ (of FIG. 2) to provide information that is used by application generator $202_B$ (of FIG. 2) to generate an employer-customized SAQ program. Based on information received from the candidate in response to the hiring criteria questions, the SAQ program may determine at block 530 whether the candidate qualifies for the position. If determined that the candidate does not qualify for the position (e.g., the candidate does not satisfy one or more of the employer's required hiring criteria), the SAQ program may save the candidate's session at block 532, and notify the candidate that he/she does not qualify for the position and terminate the session, at block 534. It should be understood that such notification of failure to qualify may present the candidate the specific reason(s) for his/her failure to qualify. For example, a candidate having indicated that he/she possesses a two-year college degree may be informed that he/she failed to qualify for the position because the position requires a four-year college degree. In this manner, all candidates may be screened in a consistent manner (i.e., judged on the same criteria), and failing candidates may be notified of the specific reason(s) as to why they failed to qualify.

If it is determined at block 530 that the candidate does qualify for the desired position, then the SAQ program advances its operation to block 536, whereat the SAQ program may present a "congratulations" screen notifying the candidate that he/she has qualified for the position. Depending on the employer's preferences, the SAQ program may immediately offer a qualified candidate employment in the position for which he/she qualified. Of course, most employer's will prefer to conduct further screening, such as testing and/or personal interviews of qualified candidates before offering them a position of employment. In a most preferred embodiment, the SAQ program may assist in scheduling such further screening procedures. For example, at block 538 the SAQ program may determine whether the employer requires testing of qualified candidates for the particular position. If determined that the position does require testing, the SAQ program may access a testing calendar to determine the available testing times at block 540. At block 542, the SAQ program may present an interface to the candidate that enables the candidate to schedule the testing at an available time. Once the candidate has scheduled the testing, the SAQ program may, at block 544, update the testing calendar to reflect the newly scheduled testing. Additionally, the SAQ program may print confirmation of the testing date/time for the candidate, as well as additional information, such as the location of the testing, the anticipated length of the testing session, etcetera.

Once the required testing is scheduled or if the SAQ program determines at block 538 that testing is not required, the SAQ program advances its execution to block 546 to determine whether the employer requires a personal interview of qualified candidates for the particular position. If determined that the position does require a personal interview, the SAQ program may access a calendaring system to determine the available interview times at block 548. That is, the SAQ program may determine the interviewers for the position, and based on their calendars determine times available to the candidate. At block 550, the SAQ program may present an interface to the candidate that enables the candidate to schedule the interview at an available time. Once the candidate has scheduled the interview, the SAQ program may, at block 552, update the interviewer's calendar to reflect the newly scheduled interview. Additionally, the SAQ program may print confirmation of the interview date/time for the candidate, as well as additional information, such as the name of the interviewers, the anticipated length of the interview, etcetera. Furthermore, the SAQ program may forward (e.g., via e-mail) information about the candidate to each of the interviewers and/or other suitable hiring personnel, such as information obtained during the qualification session. Further still, additional information may provided to the SAQ program by the candidate, such as a resume, writing sample, letters of recommendation, etcetera, which may input to the SAQ program via a digital imaging device, fax, e-mail, or any other suitable means for inputting such information, and such information may be transmitted (e.g., via e-mail) to the interviewers and/or other suitable hiring personnel.

Once the required interview is scheduled or if the SAQ program determines at block 546 that an interview is not required, the SAQ program advances its execution to block 554 to save the qualification session, and then a screen is displayed to the candidate at block 556 notifying the candidate that the session is over. As the exemplary SAQ program of FIG. 5 demonstrates, a preferred embodiment allows an employer to generate a customized SAQ program that significantly reduces the amount of human resources required for processing candidates for employment.

It should be understood that the operational flow diagram of FIG. 5 is intended only as an example, and one of ordinary skill in the art will recognize that in alternative embodiments the order of operation for the various blocks may be varied, certain blocks of operation may be omitted completely, and additional operational blocks may be added. Thus, the present invention is not intended to be limited only to the operational flow diagram of FIG. 5 for a customized SAQ program, but rather such operational flow diagram is intended solely as an example that renders the disclosure enabling for many other operational flow diagrams for implementing a customized SAQ program.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for qualifying candidates for employment with an employer, said method comprising:

executing a computer program, said computer program receiving as input from said employer a desired hiring criteria of said employer;

based on said desired hiring criteria of said employer, said computer program generating at least one customized application program that is executable to interact with candidates for employment with said employer and determine whether each of said candidates is qualified for employment with said employer;

allowing said candidates access to the at least one generated customized application program; and responsive to input from each of said candidates to the at least one generated customized application program, said at least one generated customized application program automatically determining whether each of said candidates qualifies for a position of employment with the employer.

2. The method of claim 1 wherein said desired hiring criteria includes at least one criteria selected from the group consisting of:

candidate's education, candidate's work experience, candidate's possessing a particular license, candidate's language skills, and candidate's computer skills.

3. The method of claim 1 wherein said computer program provides a predetermined list of hiring criteria for selection by said employer as said desired hiring criteria.

4. The method of claim 3 wherein said computer program allows said employer to input additional hiring criteria not included on said predetermined list.

5. The method of claim 1 wherein said computer program includes a user interface for interacting with said employer to receive as input said desired hiring criteria from said employer.

6. The method of claim 1 wherein said computer program receiving said desired hiring criteria further includes:
   receiving said desired hiring criteria from a user interface.

7. The method of claim 6 wherein said user interface is a separate program executable to communicate with said computer program.

8. The method of claim 1 wherein said at least one customized application program is executable to interact with a candidate to enable said candidate to self-administer a qualification session for a position of employment with said employer.

9. The method of claim 1 wherein said at least one customized application program enables access by one or more candidates via at least one communication platform.

10. The method of claim 9 wherein said at least one communication platform includes platforms selected from the group consisting of: telephony-based platform, web-based platform, and other processor-based platforms.

11. The method of claim 9 wherein said at least one customized application program includes an IVR application that enables access by one or more candidates via telephone.

12. The method of claim 9 wherein said at least one customized application program includes a web-based application that enables access by one or more candidates via a processor-based device via the World Wide Web.

13. The method of claim 1 wherein said generating step includes:
   generating a plurality of said customized application program.

14. The method of claim 13 wherein each of said plurality of customized application programs is executable to enable interaction with candidates via a different communication platform.

15. The method of claim 1 further comprising:
   said computer program receiving as input from said employer preferences of said employer as to characteristics of said at least one customized application program.

16. The method of claim 15 wherein said computer program receives as input from said employer indication of one or more communication platforms on which said at least one customized application program is to enable access by candidates.

17. The method of claim 1 wherein said at least one customized application program is executable to assist in further screening of candidates beyond determining whether based on said desired hiring criteria said candidates qualify for a position of employment with the employer.

18. The method of claim 17 wherein said at least one customized application program is executable to schedule future testing with a candidate determined based on said desired hiring criteria to be qualified for a position of employment with the employer.

19. The method of claim 17 wherein said at least one customized application program is executable to administer testing of a candidate determined based on said desired hiring criteria to be qualified for a position of employment with the employer.

20. The method of claim 17 wherein said at least one customized application program is executable to schedule a future personal interview with hiring personnel of the employer and a candidate determined based on said desired hiring criteria to be qualified for a position of employment with the employer.

21. The method of claim 20 wherein said at least one customized application program interacts with a calendaring program to schedule said future personal interview at a time available for said hiring personnel.

22. The method of claim 17 wherein said at least one customized application program is executable to forward supplemental materials to hiring personnel of the employer for a candidate determined based on said desired hiring criteria to be qualified for a position of employment with the employer.

23. The method of claim 22 wherein said supplemental materials include at least one of the materials selected from the group consisting of: candidate resume, writing sample, questionnaire, letter of recommendation, and school transcript.

24. The method of claim 22 wherein said at least one customized application is executable to forward said supplemental materials to hiring personnel electronically.

25. The method of claim 24 wherein said at least one customized application is executable to forward said supplemental materials to hiring personnel via at least one communication method selected from the group consisting of: e-mail and fax.

26. The method of claim 22 further comprising the step of:
   said at least one customized application receiving said supplemental materials from a candidate.

27. The method of claim 26 wherein said at least one customized application receives said supplemental materials via at least one of the following methods:
   fax, e-mail, and digital imaging device.

28. The method of claim 1 further comprising the step of:
   said at least one customized application program outputting to a candidate determined by said customized application program as not qualifying for a position of employment with the employer one or more reasons for said candidate not qualifying.

29. The method of claim 1 further comprising the step of:
   storing to a database information about a candidate received by said at least one customized application.

30. A system for use in qualifying candidates for employment with an employer, said system comprising:
   a processor-based device; and
   a computer program executable by said processor-based device to receive as input desired hiring criteria of said employer and generate at least one application program, wherein said desired hiring criteria specifies at least one attribute to be possessed by a candidate to be considered qualified for a position of employment, and wherein said at least one application program is executable to interact with candidates and determine whether each of said candidates qualifies for said position of employment with said employer.

31. The system of claim 30 wherein said processor-based device is a device selected from the group consisting of: PC, workstation, laptop computer, and PDA.

32. The system of claim 30 wherein said processor-based device is a server computer.

33. The system of claim 32 wherein said server computer comprises a web server.

34. The system of claim 30 wherein said at least one attribute includes an attribute concerning one selected from the group consisting of:

candidate's education, candidate's work experience, candidate's possessing a particular license, candidate's language skills, and candidate's computer skills.

35. The system of claim 30 wherein said computer program includes a user interface for interacting with said employer to receive as input said desired hiring criteria.

36. The system of claim 30 wherein said at least one application program is executable to interact with a candidate to enable said candidate to self-administer a qualification session for a position of employment with said employer.

37. The system of claim 30 wherein said at least one application program enables access by one or more candidates via at least one communication platform.

38. The system of claim 37 wherein said at least one communication platform includes platforms selected from the group consisting of: telephony-based platform, web-based platform, and other processor-based platforms.

39. The system of claim 37 wherein said at least one application program includes an IVR application that enables access by one or more candidates via telephone.

40. The system of claim 37 wherein said at least one application program includes a web-based application that enables access by one or more candidates via a processor-based device via the World Wide Web.

41. The system of claim 30 wherein said computer program is executable to generate a plurality of said application programs.

42. The system of claim 41 wherein each of said plurality of application programs is executable to enable interaction with candidates via a different communication platform.

43. The system of claim 30 further including an input device communicatively coupled to said processor-based device to enable candidates to input supplemental materials to said processor-based device.

44. The system of claim 43 wherein said supplemental materials include at least one of the materials selected from the group consisting of: candidate resume, writing sample, questionnaire, letter of recommendation, and school transcript.

45. The system of claim 43 wherein said input device includes at least one device selected from the group consisting of fax machine and digital imaging device.

46. The system of claim 43 wherein said at least one application program is executable to electronically communicate said supplemental materials to hiring personnel.

47. The system of claim 46 wherein said at least one application program is executable to electronically communicate said supplemental materials via at least one communication method selected from the group consisting of e-mail and fax.

48. The system of claim 30 further comprising a data storage device communicatively coupled to said processor-based device to enable storage of data received by said at least one application program.

49. The system of claim 48 wherein said data storage device is at least one device selected from the group consisting of: hard drive, floppy disk, Compact Disc (CD), Digital Versatile Disc (DVD), and other data storage devices.

50. The system of claim 30 wherein said processor-based device is communicatively coupled to a communication network to enable access by said employer to said computer program via said communication network.

51. The system of claim 50 wherein said communication network is a network selected from the group consisting of: PSTN, wireless communication network, a proprietary network, general purpose processor-based information network, dedicated communication lines, computer network, direct PC to PC connection, LAN, WAN, modem to modem connection, Internet, Intranet, Extranet, or any combination thereof.

52. The system of claim 51 wherein said processor-based device is communicatively coupled to a communication network to enable access by said candidates to said at least one application program via said communication network.

53. The system of claim 52 wherein said communication network is a network selected from the group consisting of: PSTN, wireless communication network, a proprietary network, general purpose processor-based information network, dedicated communication lines, computer network, direct PC to PC connection, LAN, WAN, modem to modem connection, Internet, Intranet, Extranet, or any combination thereof.

54. Computer executable program code stored to a computer-readable medium said code for generating customized programs for qualifying candidates for employment with an employer, said computer executable program code comprising:
   code for presenting a user interface for receiving hiring criteria from an employer;
   code for presenting a user interface for receiving preferences from said employer regarding operational characteristics of at least one qualification program to be generated; and
   code for generating at least one qualification program for interacting with candidates in accordance with said received preferences and determining whether each of said candidates qualifies for a position of employment with said employer.

55. The computer executable program code of claim 54 wherein said code for presenting and code for generating are part of a common computer program.

56. The computer executable program code of claim 54 wherein said code for presenting and said code for generating are each part of separate computer programs that are capable of communicating with each other.

57. The computer executable program code of claim 54 wherein said at least one qualification program is executable to interact with a candidate to enable said candidate to self-administer a qualification session for a position with said employer.

58. The computer executable program code of claim 54 wherein said at least one qualification program enables access by one or more candidates via at least one communication platform.

59. The computer executable program code of claim 58 wherein said at least one communication platform includes platforms selected from the group consisting of: telephony-based platform, web-based platform, and other processor-based platforms.

60. The computer executable program code of claim 58 wherein said at least one qualification program includes an IVR application that enables access by one or more candidates via telephone.

61. The computer executable program code of claim 58 wherein said at least one qualification program includes a web-based application that enables access by one or more candidates via a processor-based device via the World Wide Web.

62. A business method for qualifying candidates for employment with an employer, said business method comprising:
   allowing an employer access to a computer executable program, wherein said computer executable program enables said employer to generate at least one customized application program based on a desired hiring criteria of said employer, said desired hiring criteria defining at least one attribute desired to be possessed by a candidate to be considered qualified for a position of employment; and allowing candidates access to the at least one generated customized application program; and responsive to input from each of said candidates to the at least one customized application program, said at least one customized application program automatically determining whether each of said candidates qualifies for said position of employment with the employer.

63. The business method of claim 62 wherein said allowing an employer access further comprises:

allowing said employer access to said computer executable program via a communication network.

64. The business method of claim 63 wherein said communication network is a network selected from the group consisting of:

PSTN, wireless communication network, a proprietary network, general purpose processor-based information network, dedicated communication lines, computer network, direct PC to PC connection, LAN, WAN, modem to modem connection, Internet, Intranet, Extranet, or any combination thereof.

65. The business method of claim 62 wherein said allowing candidates access to the at least one generated customized application program further comprises:

allowing said candidates access to said at least one customized application program via a communication network.

66. The business method of claim 65 wherein said communication network is a network selected from the group consisting of:

PSTN, wireless communication network, a proprietary network, general purpose processor-based information network, dedicated communication lines, computer network, direct PC to PC connection, LAN, WAN, modem to modem connection, Internet, Intranet, Extranet, or any combination thereof.

67. The business method of claim 62 wherein said at least one customized application program is executable to assist in further screening of candidates beyond determining whether based on said desired hiring criteria said candidates qualify for a position of employment with the employer.

68. The business method of claim 67 further comprising:

if determined by said at least one customized application program based on said desired hiring criteria that a candidate is qualified for a position of employment with the employer, said at least one customized application program executing to schedule future testing with said candidate.

69. The business method of claim 68 further comprising:

if determined by said at least one customized application program based on said desired hiring criteria that a candidate is qualified for a position of employment with the employer, said at least one customized application program executing to administer testing of said candidate.

70. The business method of claim 67 further comprising:

if determined by said at least one customized application program based on said desired hiring criteria that a candidate is qualified for a position of employment with the employer, said at least one customized application program executing to schedule a future personal interview with hiring personnel of the employer and said candidate.

71. The business method of claim 70 wherein said at least one customized application program interacts with a calendaring program to schedule said future personal interview at a time available for said hiring personnel.

72. The business method of claim 67 further comprising:

if determined by said at least one customized application program based on said desired hiring criteria that a candidate is qualified for a position of employment with the employer, said at least one customized application program executing to forward supplemental materials to hiring personnel of the employer for said candidate.

73. The business method of claim 72 wherein said supplemental materials include at least one of the materials selected from the group consisting of: candidate resume, writing sample, questionnaire, letter of recommendation, and school transcript.

74. The business method of claim 72 wherein said at least one customized application is executable to forward said supplemental materials to hiring personnel electronically.

75. The business method of claim 74 wherein said at least one customized application is executable to forward said supplemental materials to hiring personnel via at least one communication method selected from the group consisting of: e-mail and fax.

76. The business method of claim 72 further comprising the step of:

said at least one customized application receiving said supplemental materials from a candidate.

77. The business method of claim 76 wherein said at least one customized application receives said supplemental materials via at least one of the following methods: fax, e-mail, and digital imaging device.

78. The method of claim 15 wherein said input of employer preferences as to characteristics of said at least one customized application program received by said computer program includes at least one selected from the group consisting of:

input indicating whether the at least one customized application program is to automatically schedule an interview with candidates determined to be qualified for a position, input indicating whether the at least one customized application program is to interact with a calendaring program to schedule an interview with candidates determined to be qualified for a position, input indicating one or more interviewers with whom an interview is to be scheduled for candidates determined to be qualified for a position, input indicating whether the at least one customized application program is to request supplemental material from candidates determined to be qualified for a position, input indicating whether the at least one customized application program is to forward supplemental material received from qualified candidates to one or more hiring managers, and input indicating whether the at least one customized application program is to schedule future testing with a candidate determined to be qualified for a position.

79. The method of claim 78 wherein said generated at least one customized application program operates in accordance with the input employer preferences.

80. The method of claim 78 wherein said supplemental material include at least one of the materials selected from the group consisting of:

candidate resume, writing sample, questionnaire, letter of recommendation, and school transcript.

81. The system of claim 30 wherein said computer program is further executable to receive as input preferences of said employer as to operational characteristics of said at least one application program to be generated.

82. The system of claim 81 wherein said computer program is operable to receive a preference of said employer as to one or more communication platforms on which said at least one application program is to enable access by candidates.

83. The system of claim 81 wherein said input of employer preferences as to operational characteristics of said at least one application program includes at least one selected from the group consisting of:
input indicating whether the at least one application program is to automatically schedule an interview with candidates determined to be qualified for a position, input indicating whether the at least one application program is to interact with a calendaring program to schedule an interview with candidates determined to be qualified for a position, input indicating one or more interviewers with whom an interview is to be scheduled for candidates determined to be qualified for a position, input indicating whether the at least one application program is to request supplemental material from candidates determined to be qualified for a position, input indicating whether the at least one application program is to forward supplemental material received from qualified candidates to one or more hiring managers, and input indicating whether the at least one application program is to schedule future testing with a candidate determined to be qualified for a position.

84. The computer executable program code of claim 58 wherein an indication of said at least one communication platform is received as one of said preferences.

85. The computer executable program code of claim 54 wherein said user interface for receiving preferences from said employer is operable to receive at least one selected from the group consisting of:
input indicating whether the at least one qualification program is to automatically schedule an interview with candidates determined to be qualified for a position, input indicating whether the at least one qualification program is to interact with a calendaring program to schedule an interview with candidates determined to be qualified for a position, input indicating one or more interviewers with whom an interview is to be scheduled for candidates determined to be qualified for a position, input indicating whether the at least one qualification program is to request supplemental material from candidates determined to be qualified for a position, input indicating whether the at least one qualification program is to forward supplemental material received from qualified candidates to one or more hiring managers, and input indicating whether the at least one qualification program is to schedule future testing with a candidate determined to be qualified for a position.

86. The business method of claim 62 further comprising:
receiving as input to said computer executable program, preferences of said employer as to operational characteristics of said at least one customized application program to be generated.

87. The business method of claim 86 wherein said input of employer preferences as to operational characteristics of said at least one customized application program received by said computer executable program includes at least one selected from the group consisting of:
input indicating whether the at least one customized application program is to automatically schedule an interview with candidates determined to be qualified for a position, input indicating whether the at least one customized application program is to interact with a calendaring program to schedule an interview with candidates determined to be qualified for a position, input indicating one or more interviewers with whom an interview is to be scheduled for candidates determined to be qualified for a position, input indicating whether the at least one customized application program is to request supplemental material from candidates determined to be qualified for a position, input indicating whether the at least one customized application program is to forward supplemental material received from qualified candidates to one or more hiring managers, and input indicating whether the at least one customized application program is to schedule future testing with a candidate determined to be qualified for a position.

88. The method of claim 1 wherein said computer program receiving as input a desired hiring criteria comprises receiving manually inputted hiring criteria from said employer, and wherein said computer program generating said at least one customized application program comprises said computer program automatically integrating the manually inputted hiring criteria into the at least one customized application program.

89. The method of claim 1 wherein said computer program receiving as input a desired hiring criteria comprises:
receiving said input defining any hiring criteria desired for said position of employment, wherein said input desired hiring criteria is not limited to a selection of hiring criteria pre-defined by said computer program.

90. The system of claim 30 wherein said input of said desired hiring criteria comprises input defining a desired hiring criteria that is not pre-defined by said computer program.

91. The computer executable program code of claim 54 wherein said code for presenting a user interface for receiving hiring criteria from an employer further comprises:
code for presenting said user interface for receiving hiring criteria that is not pre-defined by said computer executable program code.

92. The business method of claim 62 further comprising:
automatically integrating, into the generated at least one customized application program, said desired hiring criteria that is manually input into the computer executable program.

* * * * *